United States Patent
Drei

[19]

[11] Patent Number: 5,890,407
[45] Date of Patent: Apr. 6, 1999

[54] DEVICE FOR THE ADVANCEMENT OF BARS, PARTICULARLY NARROW BARS, IN AUTOMATIC LOADERS

[75] Inventor: Andrea Drei, Faenza, Italy

[73] Assignee: I.E.M.C.A. S.p.A. Industria Elettromeccanica Complessi Automatici, Faenza, Italy

[21] Appl. No.: 835,559

[22] Filed: Apr. 8, 1997

[51] Int. Cl.$^6$ ................................. B23B 13/02
[52] U.S. Cl. ............................... 82/126; 82/127
[58] Field of Search .............. 82/124, 125, 126, 82/127; 414/911

[56] References Cited

U.S. PATENT DOCUMENTS

| | | | |
|---|---|---|---|
| 3,582,000 | 6/1971 | Werkmeister et al. | 82/126 |
| 3,618,787 | 11/1971 | Nemoto | 82/126 |
| 3,941,256 | 3/1976 | Doe et al. | 82/126 |
| 4,472,987 | 9/1984 | Johnson | 82/127 |
| 4,638,693 | 1/1987 | Sugimoto | 82/127 |

*Primary Examiner*—Steven C. Bishop
*Assistant Examiner*—Mark Williams
*Attorney, Agent, or Firm*—Guido Modiano; Albert Josif

[57] ABSTRACT

A device for the advancement of bars, particularly narrow bars, in automatic loaders provided with a inclined supporting plane or with another loading system for a plurality of bars and with a mechanism for the individual release of the bars, comprising: guides, whereon supporting elements for a bar released from the plane and a carriage provided with grip elements for a bar can slide, the carriage being actuated between an initial position, where the grip elements are actuated so as to grip a bar deposited on the supporting elements, and a final position, where the bar is released by the grip elements and is secured in the spindle of an automatic lathe; a pusher which is supported so as to move parallel to itself; and actuators for actuating the pusher after the carriage between an offset position and a position wherein it is aligned with the bar deposited on the supporting elements when the carriage is in the final position.

7 Claims, 3 Drawing Sheets

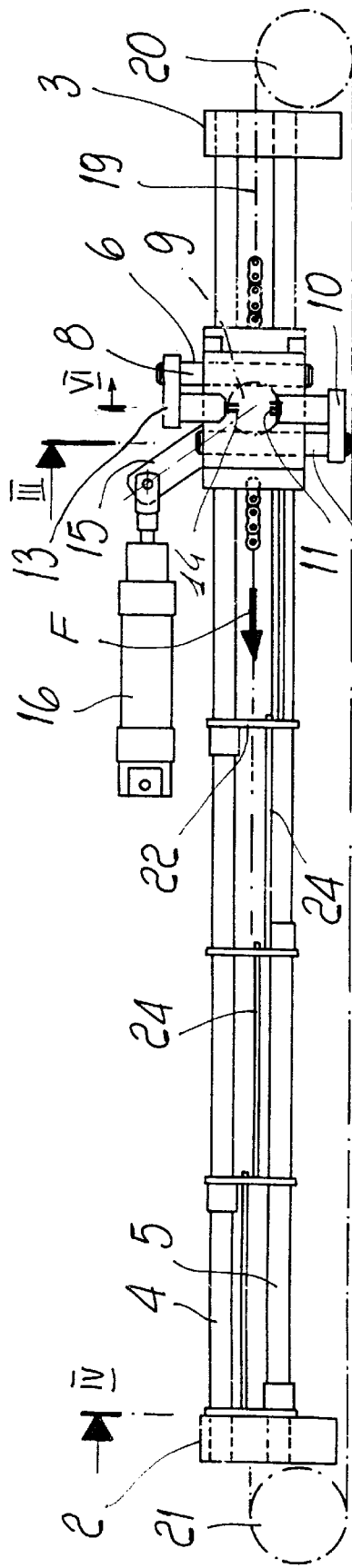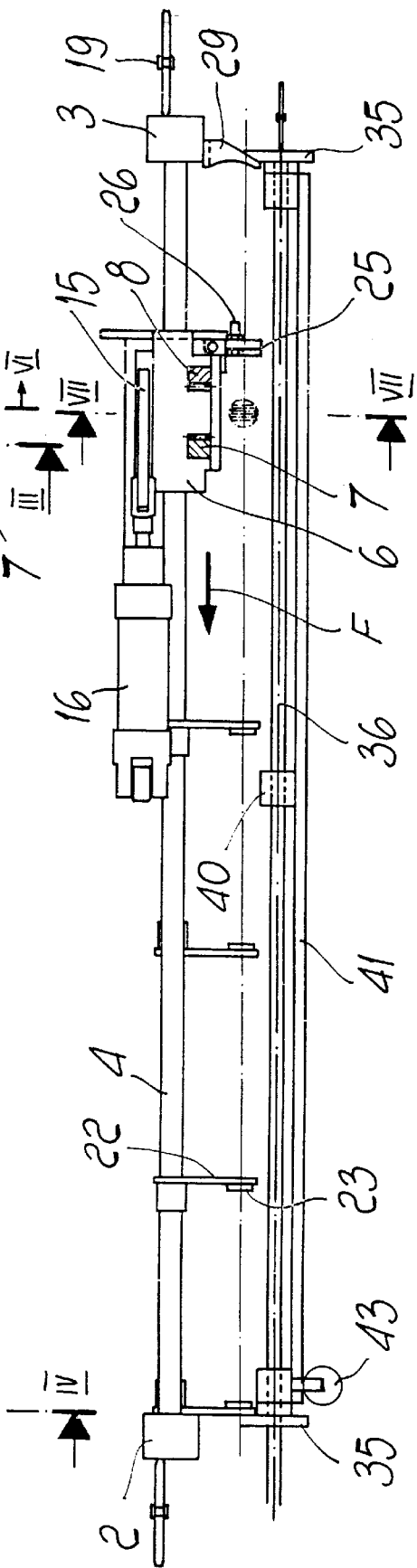
FIG.1
FIG.2

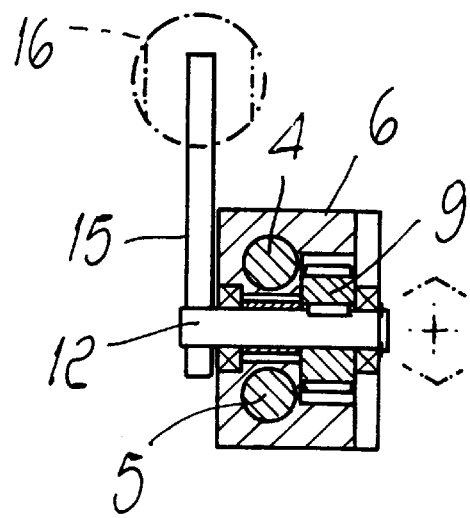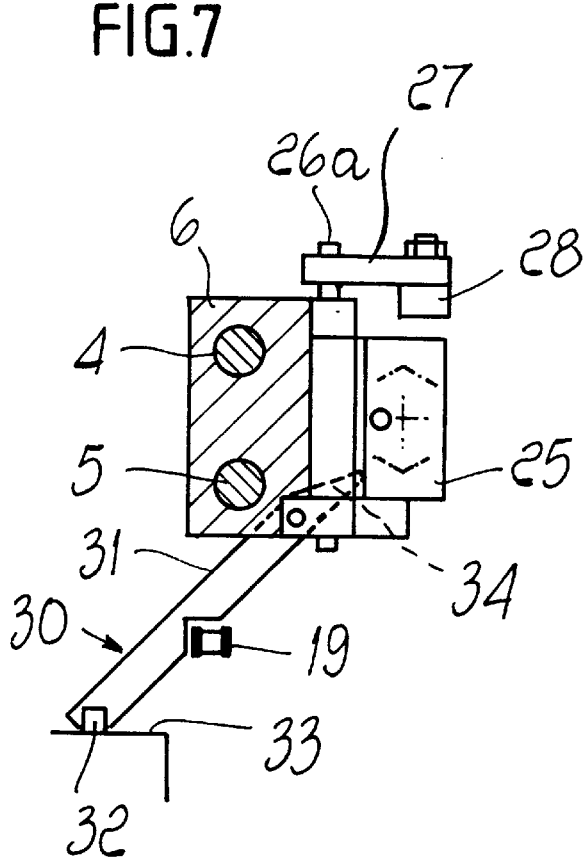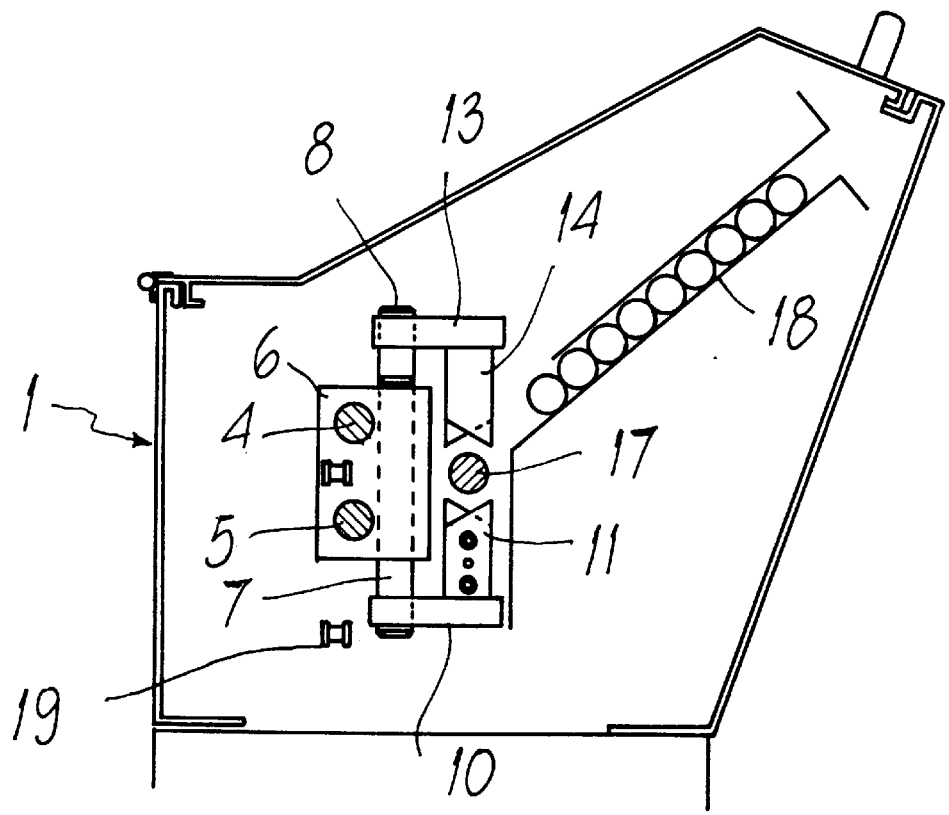

DEVICE FOR THE ADVANCEMENT OF BARS, PARTICULARLY NARROW BARS, IN AUTOMATIC LOADERS

BACKGROUND OF THE INVENTION

The present invention relates to a device for the advancement of bars, particularly narrow bars, in automatic loaders.

In conventional automatic loaders, shortcomings are observed which substantially consist in their excessive longitudinal bulk and in the difficulty in achieving the advancement of bars having a very small diameter, on the order of 1–2 mm.

SUMMARY OF THE INVENTION

A principal aim of the present invention is therefore to provide a device which allows to obviate the above mentioned drawbacks, which are typical of conventional loaders.

This aim is achieved by means of a device for the advancement of bars, particularly narrow bars, in automatic loaders provided with a loading system for a plurality of bars, with a mechanism for the individual release of said bars, and with a pusher provided with a collet which is adapted to receive the rear end of the released bar, characterized in that it comprises: guiding means, whereon supporting elements for a bar released from said system and a carriage provided with grip elements for said bar are slideable, said carriage being actuated between an initial position, wherein said grip elements are activated so as to grip a bar deposited on said supporting elements, and a final position, whereat said bar is released by said grip elements after insertion in the collet of the pusher and is secured in the spindle of an automatic lathe, said pusher being supported so as to move parallel to itself; and means for locking and actuating said pusher after said carriage between an offset position and a position where it is aligned with the bar deposited on said supporting elements when said carriage is in the final position.

BRIEF DESCRIPTION OF THE DRAWINGS

Further particularities of the present invention will become apparent from the following description of a preferred embodiment, illustrated only by way of non-limitative example in the accompanying drawings, wherein:

FIG. 1 is a partially schematic elevation view of the device according to the invention;

FIG. 2 is a plan view of the device of FIG. 1;

FIG. 3 is a sectional view, taken along the plane III—III of FIG. 1;

FIG. 6 is a sectional view, taken along the plane VI—VI of FIG. 1;

FIG. 7 is a sectional view, taken along the plane VII—VII of FIG. 2.

DESCRIPTION OF THE PREFERRED EMBODIMENTS

Figure 4:
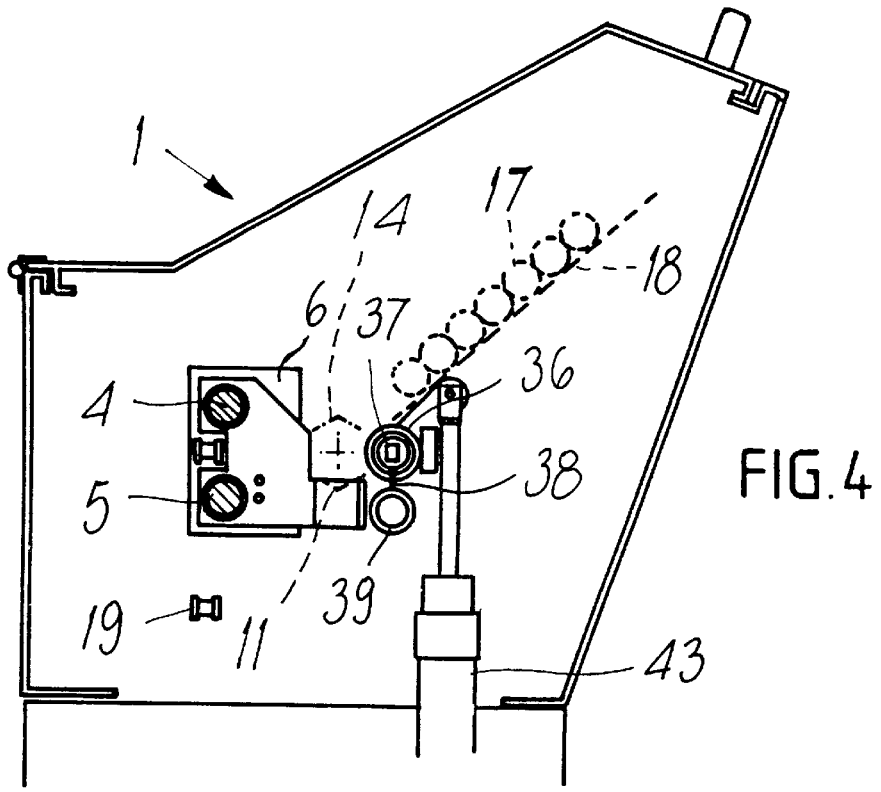
FIG. 4 is a sectional view, taken along the plane IV—IV of FIG. 1.
Figure 5:
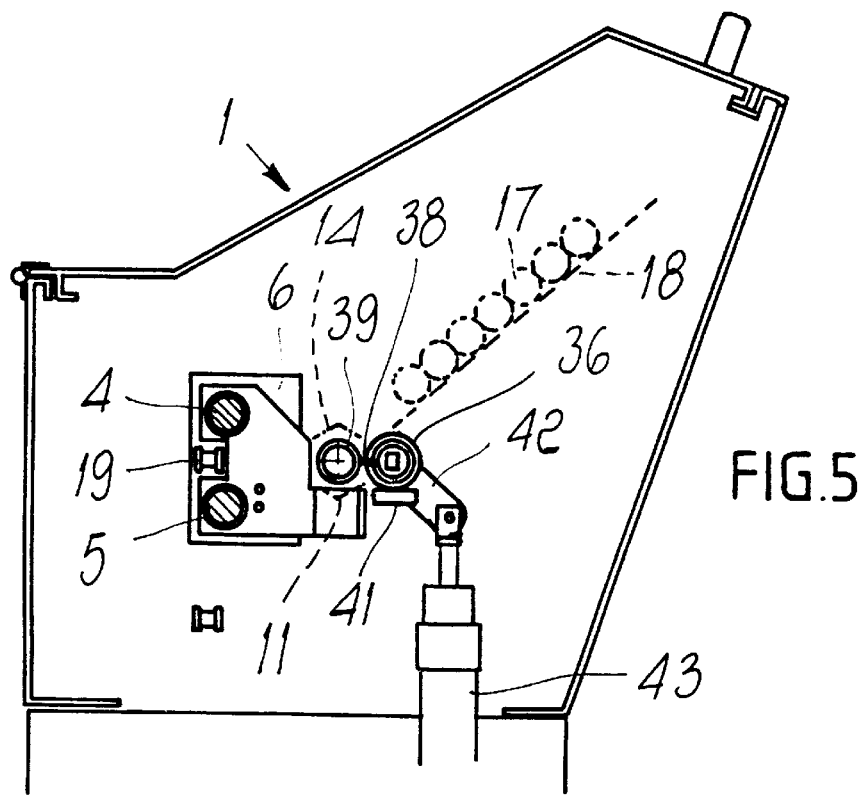
FIG. 5 is a sectional view, taken along the same plane as FIG. 4, but in a different (subsequent) operating condition.

With reference to the above figures, the reference numeral 1 designates a housing for containing the device, which comprises two uprights 2 and 3 which are inter-connected by two horizontal and parallel rods 4 and 5 lying on a vertical plane.

A carriage 6 is slideable on the rods 4 and 5 and two parallel posts 7 and 8, arranged at right angles to the rods 4 and 5, are axially guided but prevented from rotating. The posts 7 and 8 are provided with respective racks, with which there meshes a pinion 9 keyed to a shaft 12 which is rotatably supported in the carriage 6.

One end of the post 7 protrudes downwards from the carriage 6, and an arm 10 is rigidly coupled thereto and supports a set of three equidistant V-shaped blades 11. Likewise, one end of the post 8 protrudes above the carriage 6 and an arm 13 is rigidly coupled thereto supporting two equally V-shaped blades 14 which are co-planar with respect to the interspaces between the blades 11. A lever 15 is radially rigidly coupled to the shaft 12, and the stem of a fluid-actuated jack 16 is articulately connected to said lever; the cylinder of said jack is articulately supported in a bracket (not shown) which is fixed to the carriage 6.

The actuation of the jack 16 causes an oscillation of the lever 15 and therefore a rotation of the pinion 9 such as to cause an approach or spacing of the blades 11 and 14 which is sufficient to clamp or release a bar 17 taken from a magazine and meant to be fed to the automatic lathe with which the device is associated. The magazine from which the bar is taken is constituted by an inclined plane 18 which leads between the blades 11 and 14 on the opposite side with respect to the carriage 6. The bars are deposited side by side on the plane 18 and are released one at a time by means of a known individual selection mechanism (not shown).

The carriage 6 is moved along the rods 4 and 5 by means of a transmission composed of a chain 19 wound around two pinions 20 and 21, one of which is motorized. The chain 19 has two ends which are coupled to the carriage 6 and comprises two portions which are parallel to the rods 4 and 5.

A plurality of brackets 22 are slidingly supported on the rods 4 and 5, along the portion between the upright 2 and the carriage 6, and bear supports 23 provided with recesses which are open upwards and being V-shaped like the blades 11.

These recesses are substantially aligned along a line A passing through the point where the internal vertices of the blades 11 and 14 coincide when they are moved closer to each other. The line A is coaxial to the rotation axis of the spindle of the lathe to be fed with the bars.

The brackets 22 are inter-connected by tie rods 24 slideable therein so as to allow the brackets 22 to stack up against the upright 2 when the carriage 6 moves to the left. Vice versa, when the carriage shifts to the right, the tie rods 24 allow the sequential traction of the brackets 22 and their mutual spacing by an extent that is equal to the length of said tie rods.

When the carriage 6 is fully shifted to the right, i.e., when the brackets 22 are spaced one from the other, it is possible to deposit, on the supports 23 and between the blades 11 and 14, a bar 17 arriving from the plane 18 and released by the individual selection device.

The actuation of the jack 16, and therefore the closure of the blades 11 and 14 to grip the released bar, are controlled by a device which detects beforehand the presence of the bar 17 on the supports 23.

Said device comprises a flat plate 25 provided with a sensor 26 and fixed on a vertical shaft 26a which is rotatably supported in the carriage 6.

The upper end of the shaft 26a protrudes upwards from the carriage 6 and an arm 27, which supports a roller 28, is coupled to said end.

The roller 28 is meant to cooperate with a locator 29 which is fixed to the top of the upright 3 and allows to reset the flat plate 25 once it has been released, as will become apparent hereinafter, to allow the intervention of the elements provided for the advancement of the bar towards the lathe.

In order to retain the flat plate 25 in the reset position, i.e., at right angles to the rods 4 and 5, there is provided a lever 30 which is pivoted in the carriage 6 below the flat plate 25. Said lever has an arm 31 protruding downwards at an angle and supporting a roller 32 which rotatably engages a straight cam 33 which runs parallel to the bars 4 and 5 below the carriage 6.

The second arm 34 of the lever 30 is adapted to act as retainer for the flat plate 25.

The cam 33 has such a profile as to prevent the flat plate 25, by means of the arm 34, from rotating into the position which is parallel to the bars 4 and 5 over a certain extent which lies between the locator 29 and the upright 2. When the carriage 6 is near the upright 2, the cam 33 lifts the arm 31 of the lever 30, causing the arm 34 to move downwards until the flat plate 25 is allowed to rotate freely.

With the flat plate 25 in this position, it is possible to act on the bar 17 with a device which feeds the bar into the lathe to perform the intended machining operations. Said device includes two shoulders 35, which protrude from the uprights 2 and 3 and wherebetween a guide 36 for a chain 37 is provided. The chain 37 is closed in a loop about respective toothed pulleys (not shown), one of which is motorized. The guide 36 is rotatable with respect to the shoulders 35 and has a longitudinal slot through which a flap 38 protrudes laterally; a bar pusher 39 is rigidly coupled to said flap, is parallel to A, and is provided with a collet to grip the bar to be fed. The flap 38 is rigidly coupled axially to the chain but it is rotatable thereabout.

The guide 36 is supported by a plurality of bushes 40 which are inter-connected by a longitudinal member 41.

The bushes 40 are provided with lateral slots to allow, like the guide, the passage of the flap 38 during the advancement of the bar pusher.

An arm 42 is radially rigidly coupled to the longitudinal member 41 and is connected to a jack 43, whose actuation causes the rotation of the guide through an angle of 90° which allows the bar pusher 39 to oscillate from a lowered position below the guide (FIG. 4) to a raised position in which it is aligned with A.

The operation of the described device is as follows.

Assume that the carriage 6 is arranged proximate to the right upright 3, with the blades 11 and 14 spaced apart, and that the bar pusher 39 is also fully shifted to the right, below the guide 36, as shown in FIG. 4. When the carriage 6 is in the indicated position, the brackets 22 are spaced one from the other, so that by actuating the individual selection device it is possible to remove a single bar 17 from the magazine and deposit it on the supports 23. At this point, the chain 19 is actuated and, by moving the carriage 6 towards the left in the direction F, causes the abutment of the flat plate 25 against the end of the rod which is deposited on the supports 23. During this step, the flat plate is kept by the lever 30 on a plane which is perpendicular to the carriage advancement direction.

By means of the sensor 26, the jack 16 is then actuated, and by means of the posts 7, 8 and pinion 9 actuates the closure of the blades 11 and 14, which grip the bar 17 and insert it in the spindle of the lathe as the stroke of the carriage 6 continues.

During the stroke of the carriage 6, after the blades 11 and 14 have clamped around the bar 17, the cam 33 actuates the oscillation of the lever 30 into a position for disengagement from the flat plate 25, which by means of spring means is returned to an arrangement which is parallel to the bars 4 and 5 outside the axial space occupation of the bar.

When the carriage 6 has reached the left stroke limit and the brackets 22 have stacked up against the upright 2, the jack 43 is actuated, causing the oscillation of the bar pusher 39 into a position that is coaxial to the advancement line A.

At this point, the bar 17 is inserted in the collet of the bar pusher 39, again by means of the chain 19.

Then, after actuating the jack 16 in the direction for opening the blades 11–14, the bar pusher 39 can act on the bar 17 and push it into the spindle of the lathe for the intended machining steps.

During the operation of the bar pusher 39, the carriage 6 waits in the forward position until said bar pusher returns with the final machining stub of the bar 17.

Once the return stroke of the bar pusher 39 has been performed, by actuating the jack 16 in the direction for closing the blades 11–14 it is possible to extract the bar stub from the collet of the bar pusher by acting on the chain 19.

The bar pusher 39 can return to the initial position and the carriage 6, with the stub, is returned to the initial position, which is close to the upright 3, until the roller 28 engages on the locator 29.

This engagement causes the rotation of the flat plate 25 into the position that lies at right angles to the rods 4 and 5, where it is retained by the oscillation of the lever 30 allowed by the cam 33.

Accordingly, the actuation of the jack 16 causes the opening of the blades and the fall of the bar stub always in the rear position of the loader.

The cycle is repeated in the above described manner.

It is evident that the described invention perfectly achieves the intended aim and objects.

In particular, the grip of the bar by the blades prevents the danger of deformations during the pre-advancement stroke in the loader, prior to insertion in the collet of the bar pusher, furthermore the safe grip of the bar allows to achieve high speeds and to perform sharp braking actions, which would otherwise not be allowed, reducing cycle timings.

Numerous modifications and variations are possible in the practical embodiment of the invention and all are within the scope of the same inventive concept expressed in the appended claims.

What is claimed is:

1. A device for the advancement of bars in automatic loaders provided with a loading system for a plurality of bars, with a mechanism for the individual release of said bars, and with a pusher adapted to connect with a collet which is adapted to receive the rear end of a released bar, comprising: guiding means, whereon supporting elements to support a bar released from said system, and a carriage provided with grip elements for said bar, are slideable, said carriage being actuated between an initial position, where said grip elements are actuated so as to grip the bar deposited on said supporting elements, and a final position, where said bar is released by said grip elements, after inserting the bar in the collet, and is inserted in a spindle of an automatic lathe, said pusher being supported so as to translate; and means for locking and actuating said pusher between an offset position and a position where said pusher is aligned with the bar deposited on said supporting elements when said carriage is in the final position.

2. A device according to claim 1, comprising: a flat plate articulated on said carriage and adapted to oscillate between a position for abutment on said bar and an inactive position; and a sensor mounted on said flat plate and adapted to detect the abutment of said flat plate against one end of said bar and to activate said grip elements to grip said bar; said flat plate being retained in said abutment position by a lever which is articulated on said carriage and is controlled by a cam, said cam being adapted to actuate said lever from a position for retaining said flat plate in said abutment position into a position where said flat plate can assume said inactive position.

3. A device according to claim 1, wherein said grip elements are constituted by V-shaped blade elements which are actuated in mutual contrast to grip the released bar interposed between them.

4. A device according to claim 3, wherein said blade elements are fixed on two respective posts which are parallel and slidingly supported in said carriage and have racks which mesh with a pinion, with which a lever is radially rigidly coupled, a fluid-actuated jack mounted on said carriage acting on said lever.

5. A device according to claim 4, wherein said supporting elements are constituted by brackets provided with supports for said released bar, said brackets being connected by tie rods slideable therein to allow the brackets to stack up on the side towards which said carriage advances.

6. A device according to claim 5, wherein said pusher is connected to a flexible traction element slideable in a guide, locking means being provided for locking and rotating said pusher from said offset position to an aligned position for pushing on said bar when said carriage is in said final position and said flat plate is in said inactive position.

7. A device according to claim 6, wherein said guide is rotatably supported and said pusher is connected to said flexible traction element by means of a flap which is guided through a slot of said guide, said guide being actuated by a fluid-actuated jack between said offset and aligned positions of said pusher with respect to said bar.

\* \* \* \* \*